(12) United States Patent
Kaneko et al.

(10) Patent No.: US 11,140,369 B2
(45) Date of Patent: Oct. 5, 2021

(54) IMAGE GENERATION METHOD AND IMAGE SYNTHESIS METHOD

(71) Applicant: NITTO DENKO CORPORATION, Ibaraki (JP)

(72) Inventors: Muneo Kaneko, Osaka (JP); Kazuya Yoshimura, Ibaraki (JP); Katsunori Takada, Ibaraki (JP); Reiko Shinagawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/957,840

(22) PCT Filed: Dec. 17, 2018

(86) PCT No.: PCT/JP2018/046302
§ 371 (c)(1),
(2) Date: Jun. 25, 2020

(87) PCT Pub. No.: WO2019/131271
PCT Pub. Date: Jul. 4, 2019

(65) Prior Publication Data
US 2021/0067748 A1 Mar. 4, 2021

(30) Foreign Application Priority Data
Dec. 26, 2017 (JP) .............................. JP2017-248781

(51) Int. Cl.
*H04N 9/04* (2006.01)
*H04N 9/07* (2006.01)

(52) U.S. Cl.
CPC ............. *H04N 9/0455* (2018.08); *H04N 9/07* (2013.01)

(58) Field of Classification Search
CPC ....................................................... H04N 9/0455
(Continued)

(56) References Cited

U.S. PATENT DOCUMENTS 5,689,317 A 11/1997 Miller
2015/0228247 A1 8/2015 Wu

FOREIGN PATENT DOCUMENTS

JP 4-83480 A 3/1992
JP 2002-232909 A 8/2002
(Continued)

OTHER PUBLICATIONS

International Search Report dated Feb. 12, 2019, issued in counterpart International Application No. PCT/JP2018/046302 (1 page).
(Continued)

*Primary Examiner* — Joel W Fosselman
(74) *Attorney, Agent, or Firm* — Westerman, Hattori, Daniels & Adrian, LLP

(57) ABSTRACT

There is provided an image generation method and an image synthesis method each of which can achieve an entire image having excellent image quality. An image generation method according to an embodiment of the present invention includes: arranging an image taking apparatus, a first polarizing plate, an object, and a second polarizing plate in the stated order; arranging a retardation plate between the first polarizing plate and the second polarizing plate; and monochromatizing a color of the second polarizing plate recognized by the image taking apparatus to a color complementary to that of the object through use of the retardation plate.

8 Claims, 3 Drawing Sheets

(58) Field of Classification Search
USPC .................................................. 348/207.99
See application file for complete search history.

(56) References Cited

FOREIGN PATENT DOCUMENTS

| JP | 2002232909 | * | 8/2002 | ............ G03B 15/06 |
| JP | 2004-282167 A | | 10/2004 | |
| JP | 4426992 B2 | | 3/2010 | |
| JP | 2015-530004 A | | 10/2015 | |

OTHER PUBLICATIONS

Extended (Supplementary) European Search Report dated Jul. 15, 2021, issued in counterpart EP application No. 18893671.0. (7 pages).

* cited by examiner

IMAGE GENERATION METHOD AND IMAGE SYNTHESIS METHOD

TECHNICAL FIELD

The present invention relates to an image generation method and an image synthesis method.

BACKGROUND ART

An image synthesis technology has been widely used in a video field, such as television broadcasting or a movie. Image synthesis is typically performed by the following procedure: an image of an object, such as a person, which is a foreground (hereinafter simply referred to as "object") is taken with a camera or the like against the background of a backscreen made of cloth having, for example, a blue color or green color that is a complementary color to a skin color; and a chroma key apparatus is used to detect a signal of the taken image corresponding to, for example, the blue color and extract an object image region, to transparentize information about a background image as a key signal, and to subject the object image and another background image to image synthesis.

The conventional image synthesis technology involves the following problems. (i) An extremely precise lighting technology is needed to uniformize, for example, the blue color of the backscreen. (ii) The peripheral edge portion of the object is colored to the color of the backscreen (e.g., a blue color or a green color) under the influence of the reflection of illumination light. (iii) Light cannot be applied from the rear of the backscreen, and hence the image quality of a synthesized image may be insufficient. As a result, to lengthen a distance between the object and the backscreen, a large backscreen is needed (therefore, a large studio is needed), the number of lighting apparatus increases and many kinds of lighting apparatus are needed, and there arises a need to rely on, for example, the ability and know-how of a lighting technician. (iv) The color of the backscreen needs to be changed in accordance with the color of the object, and hence there arises a need to prepare backscreens of many colors and to replace the backscreen in accordance with the object.

CITATION LIST

Patent Literature

[PTL 1] JP 2002-232909 A
[PTL 1] JP 2015-530004 A

SUMMARY OF INVENTION

Technical Problem

The present invention has been made to solve the conventional problems, and an object of the present invention is to provide an image generation method and an image synthesis method each of which: eliminates needs for a large studio, a large number, or many kinds, of lighting fixtures, and the know-how of a lighting technician; suppresses undesired coloring of an object; can easily deal even with a change in color of the object; and enables the utilization of light from the rear, and as a result, can achieve an entire image having excellent image quality.

Solution to Problem

An image generation method according to an embodiment of the present invention includes: arranging an image taking apparatus, a first polarizing plate, an object, and a second polarizing plate in the stated order; arranging a retardation plate between the first polarizing plate and the second polarizing plate; and monochromatizing a color of the second polarizing plate recognized by the image taking apparatus to a color complementary to that of the object through use of the retardation plate.

In one embodiment of the present invention, the first polarizing plate and the second polarizing plate are arranged so that an absorption axis of a polarizer of the first polarizing plate and an absorption axis of a polarizer of the second polarizing plate are substantially perpendicular or substantially parallel to each other.

In one embodiment of the present invention, the retardation plate is arranged so that an angle formed by a slow axis of the retardation plate, and an absorption axis of a polarizer of the first polarizing plate and/or an absorption axis of a polarizer of the second polarizing plate is from 40° to 50° or from 130° to 140°.

In one embodiment of the present invention, the retardation plate has an in-plane retardation Re(550) of 200 nm or more. In one embodiment of the present invention, the color of the second polarizing plate recognized by the image taking apparatus is monochromatized to a green color.

In one embodiment of the present invention, the method further includes arranging a lighting apparatus on a side of the second polarizing plate opposite to the object, wherein the lighting apparatus has a lighting angle of 38° or more with respect to a straight line connecting the image taking apparatus and the object when viewed from above.

According to another aspect of the present invention, there is provided an image synthesis method. The method includes: arranging an image taking apparatus, a first polarizing plate, an object, and a second polarizing plate in the stated order; arranging a retardation plate between the first polarizing plate and the second polarizing plate; monochromatizing a color of the second polarizing plate recognized by the image taking apparatus to a color complementary to that of the object through use of the retardation plate; transparentizing the color of the second polarizing plate that has been monochromatized; and synthesizing the transparentized portion with another image.

Advantageous Effects of Invention

According to the embodiments of the present invention, in a so-called chroma key technology, the optical monochromatization technology based on the retardation plate is used instead of a backscreen made of cloth. Accordingly, the image generation method and the image synthesis method can be achieved, each of which: eliminates needs for a large studio, a large number, or many kinds, of lighting fixtures, and the know-how of a lighting technician; suppresses undesired coloring of an object; can easily deal even with a change in color of the object; and enables the utilization of light from the rear, and as a result, can achieve an entire image having excellent image quality.

DESCRIPTION OF EMBODIMENTS

The embodiments of the present invention are described below. However, the present invention is not limited to these embodiments.

Figure 1:
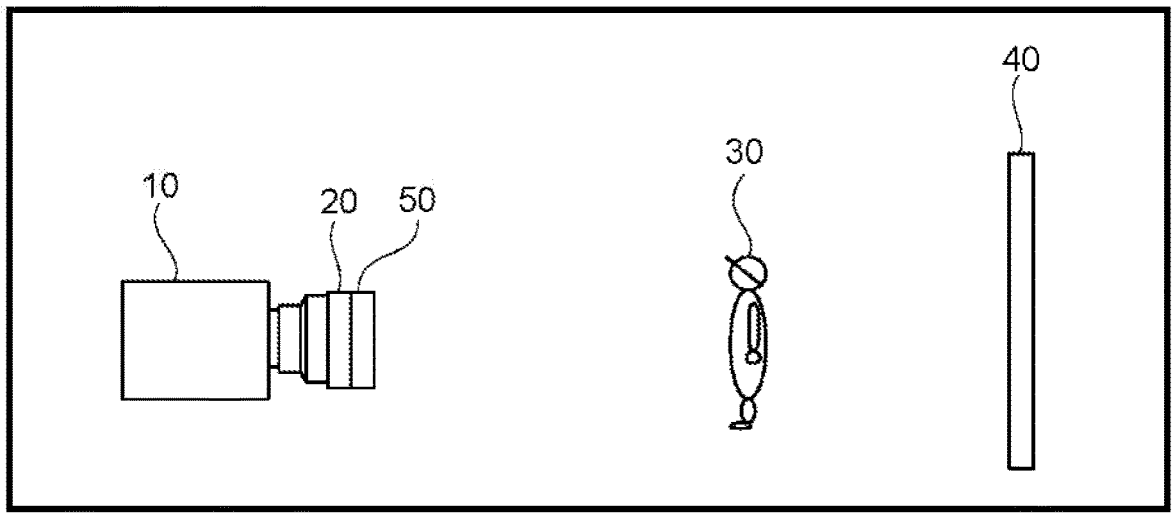
FIG. 1 is a schematic configuration view for illustrating an image generation method according to one embodiment of the present invention.
Figure 2:
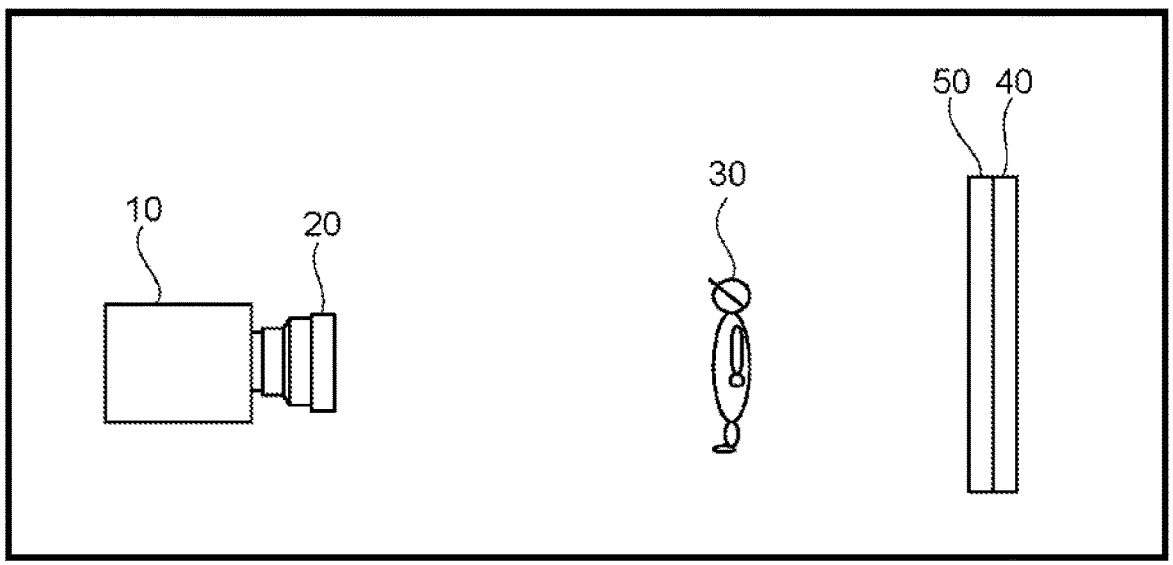
FIG. 2 is a schematic configuration view for illustrating an image generation method according to another embodiment of the present invention.
Figure 3:
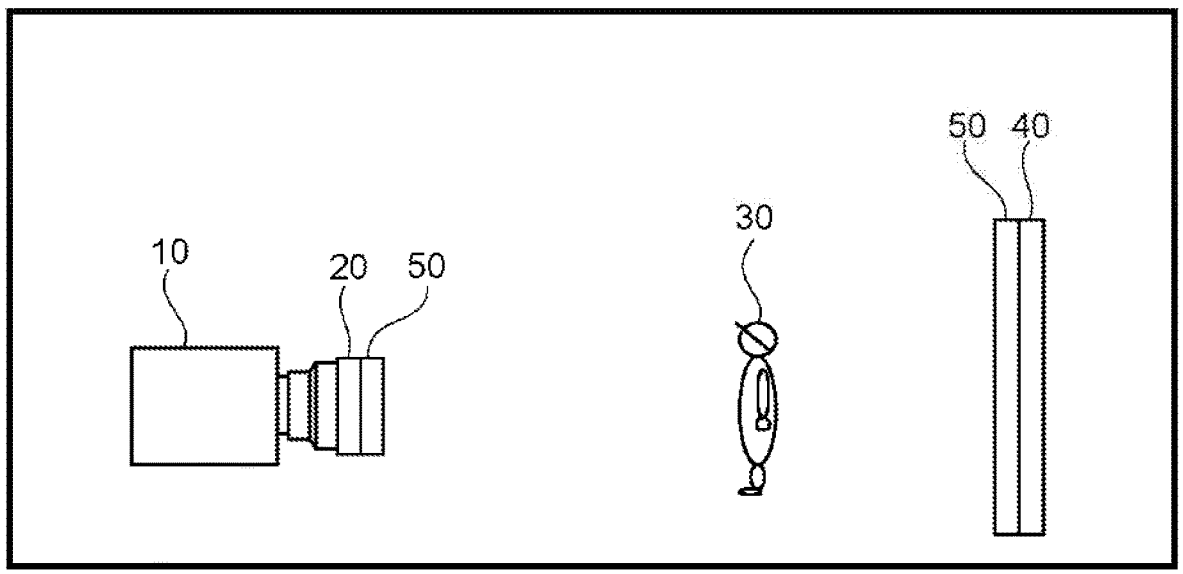
FIG. 3 is a schematic configuration view for illustrating an image generation method according to still another embodiment of the present invention.

A. Image Generation Method
A-1. Overall Configuration of Image Generation Method FIG. 1 is a schematic view for illustrating an image generation method according to one embodiment of the present invention, FIG. 2 is a schematic view for illustrating an image generation method according to another embodiment of the present invention, and FIG. 3 is a schematic view for illustrating an image generation method according to still another embodiment of the present invention. For ease of viewing, the sizes of an image taking apparatus, an object, a first polarizing plate, a second polarizing plate, and a retardation plate in each of the figures, and a mutual ratio among these sizes are different from actual ones.

The image generation method according to the embodiment of the present invention includes arranging an image taking apparatus 10, a first polarizing plate 20, an object 30, and a second polarizing plate 40 in the stated order. Specifically, in the image generation method, the second polarizing plate 40 is used instead of a backscreen, and an image of the object 30 is taken with the image taking apparatus (typically a camera apparatus) 10 against the background of the second polarizing plate 40.

In the embodiment of the present invention, a retardation plate 50 is arranged between the first polarizing plate 20 and the second polarizing plate 40. The retardation plate 50 may be arranged between the first polarizing plate 20 and the object 30 as illustrated in FIG. 1, may be arranged between the object 30 and the second polarizing plate 40 as illustrated in FIG. 2, or may be arranged in both of a space between the first polarizing plate 20 and the object 30, and a space between the object 30 and the second polarizing plate 40 as illustrated in FIG. 3. In the embodiment of the present invention, the color of the second polarizing plate 40 recognized by the image taking apparatus 10 (i.e., displayed and taken by the image taking apparatus) is monochromatized to a color complementary to that of the object 30 through use of the retardation plate 50. More specifically, the color of the second polarizing plate 40 recognized by the image taking apparatus 10 can be monochromatized to the color complementary to that of the object 30 by optimizing at least one of: the in-plane retardation Re(550) of the retardation plate; an angle between the slow axis of the retardation plate and the absorption axis of a polarizer in the first polarizing plate; an angle between the slow axis of the retardation plate and the absorption axis of a polarizer in the second polarizing plate; or an angle between the absorption axis of the polarizer in the first polarizing plate and the absorption axis of the polarizer in the second polarizing plate. In, for example, the case where the object is a person, the main color of the object is a skin color, and a complementary color thereto is a green color or a blue color, preferably a green color. In this case, the color of the second polarizing plate 40 recognized by the image taking apparatus 10 can be set to a green color or a blue color (preferably a green color) by performing such optimization as described above. As a result, the image taking apparatus can take an image of the object against the background of a green color. Such green background may function similarly to a conventional backscreen (e.g., green cloth) in a chroma key technology, and may exhibit an effect much more excellent than that of the conventional backscreen as described later. Thus, an object image against the background of an extremely uniform single color is generated, and hence the generated image can be taken.

Now, the advantage of the monochromatization of the color of the second polarizing plate recognized by the image taking apparatus as described above is described. The second polarizing plate is optically colored, and hence its color is monochromatized to a desired color in an extremely uniform manner over the entirety of the taken image (displayed image) of the image taking apparatus excluding the object. As a result, uniformity at the time of the transparentization of the color in the chroma key technology is extremely excellent, and hence the image quality of the background in a synthesized image to be obtained is also excellent. Further, such optical monochromatization has the following advantages over a case in which a backscreen made of cloth is used. (1) When the backscreen (e.g., green cloth) is used, illumination light for uniformizing the color of the backscreen is reflected, and the reflected light is reflected in the object to color the peripheral edge portion of the object to the color of the backscreen (e.g., a green color). Meanwhile, the optical coloring in the embodiment of the present invention eliminates the need for lighting for uniformizing a background color, and hence can substantially completely prevent undesired coloring of the peripheral edge portion of the object. (2) As described above, the lighting for uniformizing the color of the backscreen is not needed, and hence there is no need to arrange a large number, or many kinds, of lighting fixtures. As a result, a large studio where a lighting fixture and a backscreen can be arranged is not needed, thereby leading to an advantage in terms of cost. In addition, an image can be taken in a small studio (substantially only the arrangement of the second polarizing plate needs to be secured), and hence the number of options of the image taking markedly increases. In addition, there is no need to rely on, for example, the ability and know-how of a skilled lighting technician, and hence fluctuation in image quality resulting from image taking circumstances (e.g., the presence or absence of the securement of human resources) can be prevented. (3) The backscreen shields light from the rear. Accordingly, for example, when the object is synthesized with a background image that the light has entered from the rear, such light does not impinge on the object, and as a result, a feeling of wrongness occurs in the synthesized image. Meanwhile, according to the embodiment of the present invention, the light from the rear can be utilized. As a result, when the object is synthesized with such background image that the light has entered from the rear as described above, a synthesized image having no feeling of wrongness can be obtained. Further, the image quality of the synthesized image can be adjusted in accordance with a purpose by utilizing the light from the rear. As a result, there is no need to lengthen a distance between the object and the backscreen, and hence a large backscreen is not needed. Thus, the same effect as the (2) is obtained. Therefore, according to the embodiment of the present invention, an entire image (synthesized image) having excellent image quality can be achieved simply and easily, and at low cost.

Further, according to such optical monochromatization as described above, it becomes extremely easy to uniformly display (finally, take), on the image taking apparatus, an image of the background in accordance with the color of the object in a color complementary thereto. This is because when, for example, the in-plane retardation Re(550) of the retardation plate, and an axial angle between the retardation plate, and the first polarizing plate and/or the second polarizing plate are adjusted, a desired color can be optically achieved in the image taking apparatus (substantially the displayed image or taken image of the image taking apparatus) without any need for a large studio, and a large-scale apparatus or material. As a result, there is no need to prepare backscreens of many colors, and there is also no need to replace such many backscreens in accordance with the object. The in-plane retardation Re(550) of the retardation plate, and the axial angle between the retardation plate and each of the polarizing plates are specifically described below.

In one embodiment, the first polarizing plate 20 and the second polarizing plate 40 are arranged so that the absorption axis of the polarizer of the first polarizing plate and the absorption axis of the polarizer of the second polarizing plate are preferably substantially perpendicular or substantially parallel to each other. The expressions "substantially perpendicular" and "approximately perpendicular" as used herein each include a case in which an angle formed by two directions is 90°±7°, and the angle is preferably 90°±5°, more preferably 90°±3°. The expressions "substantially parallel" and "approximately parallel" each include a case in which an angle formed by two directions is 0°±7°, and the angle is preferably 0°±5°, more preferably 0°±3°. Further, the simple term "perpendicular" or "parallel" as used herein may include a substantially perpendicular or substantially parallel state. In addition, when reference is made to an angle in this description, the reference includes angles in both of a clockwise direction and a counterclockwise direction with respect to a reference direction.

In one embodiment, the second polarizing plate 40 may be arranged so that its absorption axis is in a vertical direction (its transmission axis is in a horizontal direction). With such configuration, the coloring of the object can be significantly suppressed. In this case, the first polarizing plate 20 may be typically arranged so that its absorption axis is in the horizontal direction (its transmission axis is in the vertical direction).

In one embodiment, the retardation plate 50 is arranged so that the angle formed by the slow axis of the retardation plate, and the absorption axis of the polarizer of the first polarizing plate 20 and/or the absorption axis of the polarizer of the second polarizing plate 40 is preferably from 40° to 50° or from 130° to 140°. The angle is more preferably from 42° to 48° or from 132° to 138°, still more preferably from 43° to 47° or from 133° to 137°, still further more preferably about 45° or about 135°.

The in-plane retardation Re(550) of the retardation plate 50 is preferably 200 nm or more. Meanwhile, the in-plane retardation Re(550) of the retardation plate 50 is preferably 2,000 nm or less. When the in-plane retardation of the retardation plate is appropriately adjusted within such ranges in combination with the adjustment of the axial angle between each of the first and second polarizing plates, and the retardation plate, the color of the second polarizing plate (background color) in the image taking apparatus can beset to a desired color. In the case where retardation plates are arranged at two sites as illustrated in FIG. 3, when the two retardation plates are arranged so that their slow axes are parallel to each other, the in-plane retardation Re(550) is the sum of the in-plane retardations of the two retardation plates. The symbol "Re(λ)" as used herein refers to the in-plane retardation of a film measured at 23° C. with light having a wavelength of λ nm. Therefore, the symbol "Re(550)" refers to the in-plane retardation of the film measured at 23° C. with light having a wavelength of 550 nm. When the thickness of the film is represented by "d" (nm), the Re(λ) is determined from the equation "Re=(nx−ny)×d". Herein, the symbol "nx" refers to a refractive index in the direction in which a refractive index in a plane becomes maximum (i.e., a slow axis direction), and the symbol "ny" refers to a refractive index in the direction perpendicular to the slow axis in the plane (i.e., a fast axis direction).

Some examples of a relationship between the angle between the absorption axis of the polarizer of the first polarizing plate and the absorption axis of the polarizer of the second polarizing plate (hereinafter sometimes referred to as "absorption axis angle"), the angle between the slow axis of the retardation plate and the absorption axis of the polarizer of the first polarizing plate (hereinafter sometimes referred to as "slow axis angle"), and the in-plane retardation Re(550) of the retardation plate, and the color of the second polarizing plate (background color) in the image taking apparatus are described below: (a) when the absorption axis angle is perpendicular, the slow axis angle is 45°, and the in-plane retardation Re(550) is from 800 nm to 900 nm, the background color is a green color; (b) when the absorption axis angle is parallel, the slow axis angle is 45°, and the in-plane retardation Re(550) is from 1,500 nm to 1,600 nm, the background color is a green color; (c) when the absorption axis angle is perpendicular, the slow axis angle is 45°, and the in-plane retardation Re(550) is from 500 nm to 600 nm, the background color is a blue color; (d) when the absorption axis angle is parallel, the slow axis angle is 45°, and the in-plane retardation Re(550) is from 500 nm to 600 nm, the background color is an orange color; (e) when the absorption axis angle is perpendicular, the slow axis angle is 45°, and the in-plane retardation Re(550) is from 400 nm to 500 nm, the background color is a yellow color; (f) when the absorption axis angle is perpendicular, the slow axis angle is 45°, and the in-plane retardation Re(550) is from 200 nm to 400 nm, the background color is a purple color; (g) when the absorption axis angle is parallel, the slow axis angle is 45°, and the in-plane retardation Re(550) is from 400 nm to 500 nm, the background color is a dark blue color; or (h) when the absorption axis angle is perpendicular, the slow axis angle is 45°, and the in-plane retardation Re(550) is from 1,500 nm to 1,600 nm, the background color is a magenta color. When the absorption axis angle, the slow axis angle, and the in-plane retardation Re(550) are appropriately adjusted in combination as described above, the background color can be set to a desired color. Moreover, a complicated apparatus and a large-scale facility are not needed in such adjustment of the absorption axis angle, the slow axis angle, and thein-plane retardation Re(550), and hence a desired background color can be obtained in accordance with, for example, the object, a desired synthesized image, and the circumstances of a studio. Further, the adjustment of the in-plane retardation Re(550) enables the fine adjustment of the background color.

Figure 4:
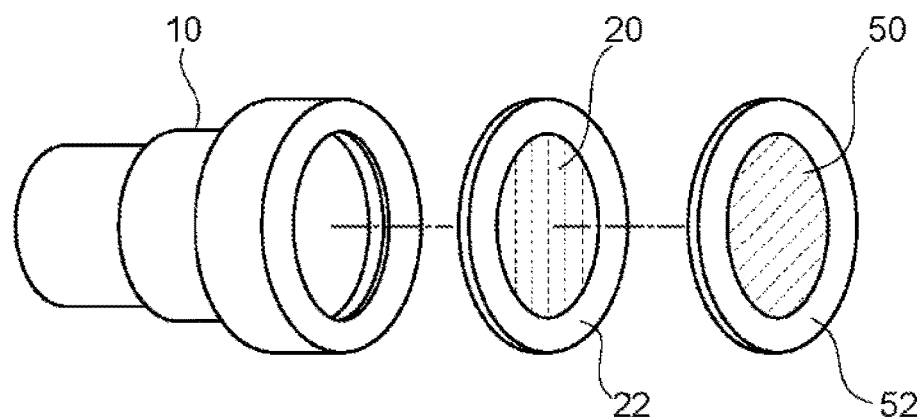
FIG. 4 is a schematic exploded perspective view for illustrating an example of a method of adjusting an axial angle between the absorption axis of the polarizer of a first polarizing plate and the slow axis of a retardation plate in the image generation method according to the embodiment of the present invention.

The adjustment of the absorption axis angle and the slow axis angle is described. FIG. 4 is a schematic exploded perspective view for illustrating an example of a method of adjusting the absorption axis angle and the slow axis angle. As illustrated in FIG. 4, the first polarizing plate 20 is rotatably mounted to the image taking apparatus (the tip portion of the lens of a camera apparatus in the illustrated example) through a holder 22. Further, the retardation plate 50 is mounted to the holder 22 of the first polarizing plate through a holder 52 in a relatively rotatable manner. The rotation of the holder 22 can set the direction of the absorption axis of the first polarizing plate. Moreover, such adjustment of the absorption axis direction by the rotation of the holder 22 can be performed in an extremely small angle unit (e.g., 1°), and hence enables the fine adjustment of the background color. Similarly, the rotation of the holder 52 relative to the holder 22 can set the slow axis angle. The setting of the slow axis angle can also be performed in an extremely small angle unit (e.g., 1°), and hence enables the fine adjustment of the background color. The setting of the slow axis angle may be performed by rotating the holder 52, may be performed by rotating the holder 22, or may be performed by rotating both the holders. The setting of the slow axis angle is practically performed by rotating the holder 52 while fixing the holder 22 (fixing the direction of the absorption axis of the first polarizing plate). With such a system as described above, the absorption axis direction of the polarizer of the first polarizing plate and the slow axis direction of the retardation plate can each be adjusted in an extremely small angle unit by fixing the absorption axis direction of the polarizer of the second polarizing plate (and the slow axis direction of the retardation plate in such cases as illustrated in FIG. 2 and FIG. 3) in a predetermined direction.

An antiglare layer and/or an antireflection layer may be arranged on the surface of the second polarizing plate 40 (in the embodiments illustrated in FIG. 2 and FIG. 3, the surface of the retardation plate 50 laminated on the second polarizing plate) as required. The arrangement of the antiglare layer and/or the antireflection layer can provide a more satisfactory background color because the arrangement can further suppress the reflection and glare of the second polarizing plate, and the reflection of ambient light in the second polarizing plate. Detailed description of the antiglare layer and the antireflection layer is omitted because a configuration well-known in the art may be adopted.

As described above, according to the embodiment of the present invention, light from the rear can be utilized. Therefore, a lighting apparatus (not shown) may be arranged behind the second polarizing plate 40. The lighting angle of the rear lighting apparatus is preferably 38° or more, more preferably 41° or more with respect to a straight line, which connects the image taking apparatus 10 and the object 30 when viewed from above, in a horizontal surface including the straight line. The upper limit of the lighting angle is, for example, 75°. When the lighting angle falls within such ranges, the coloring of the object can be significantly suppressed.

The polarizing plates and the retardation plate that may be used in the image generation method according to the embodiment of the present invention are described below.

A-2. Polarizing Plates

Any appropriate configuration may be adopted as each of the polarizing plates. The polarizing plates each typically include a polarizer and a protective film arranged on one side, or each of both sides, of the polarizer.

Any appropriate polarizer may be adopted as the polarizer. A resin film for forming the polarizer may be a single-layer resin film, or may be produced by using a laminate of two or more layers.

Specific examples of the polarizer including the single-layer resin film include polyene-based alignment films, such as: a product obtained by subjecting a hydrophilic polymer film, such as a polyvinyl alcohol (PVA)-based resin film, a partially formalized PVA-based resin film, or an ethylene-vinyl acetate copolymer-based partially saponified film, to a dyeing treatment with a dichroic substance, such as iodine or a dichroic dye, and a stretching treatment; a dehydration-treated product of PVA; and a dehydrochlorination-treated product of polyvinyl chloride. A polarizer obtained by dyeing the PVA-based resin film with iodine and uniaxially stretching the resultant is preferably used because of its excellent optical characteristics.

The dyeing with iodine is performed by, for example, immersing the PVA-based resin film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching. The PVA-based resin film is subjected to, for example, a swelling treatment, a cross-linking treatment, a washing treatment, or a drying treatment as required. For example, when the PVA-based resin film is washed with water by being immersed in the water before the dyeing, contamination and an antiblocking agent on the surface of the PVA-based resin film can be washed off. Moreover, the PVA-based resin film can be swollen to prevent its dyeing unevenness or the like.

The polarizer obtained by using the laminate is specifically, for example, a polarizer obtained by using: a laminate of a resin substrate and a PVA-based resin layer (PVA-based resin film) laminated on the resin substrate; or a laminate of a resin substrate and a PVA-based resin layer applied and formed on the resin substrate. The polarizer obtained by using the laminate of the resin substrate and the PVA-based resin layer applied and formed on the resin substrate may be produced, for example, by: applying a PVA-based resin solution to the resin substrate, followed by its drying to form the PVA-based resin layer on the resin substrate, thereby providing the laminate of the resin substrate and the PVA-based resin layer; and stretching and dyeing the laminate to turn the PVA-based resin layer into the polarizer. In this embodiment, the stretching typically includes stretching the laminate while immersing the laminate in an aqueous solution of boric acid. Further, the stretching may further include subjecting the laminate to in-air stretching at high temperature (e.g., 95° C. or more) before the stretching in the aqueous solution of boric acid as required. The resultant laminate having the configuration "resin substrate/polarizer" may be used as it is (i.e., the resin substrate may be used as a protective layer for the polarizer), or may be used after the resin substrate has been peeled from the laminate having the configuration "resin substrate/polarizer", and any appropriate protective layer in accordance with a purpose has been laminated on the peeling surface. Details about a method of producing such polarizer are described in, for example, JP 2012-73580 A, the entire description of which is incorporated herein by reference.

The protective film includes any appropriate film that may be used as a protective film for the polarizer. As a material serving as a main component for the film, there are specifically given, for example, cellulose-based resins, such as triacetylcellulose (TAC), and transparent resins, such as polyester-based, polyvinyl alcohol-based, polycarbonate-based, polyamide-based, polyimide-based, polyether sulfone-based, polysulfone-based, polystyrene-based, polynorbornene-based, polyolefin-based, cyclic olefin-based, (meth)acrylic, and acetate-based resins. There are also given, for example, thermosetting resins or UV-curable resins, such as (meth)acrylic, urethane-based, (meth)acrylic urethane-based, epoxy-based, and silicone-based resins. In addition to the foregoing, there are also given, for example, glassy polymers, such as a siloxane-based polymer. In addition, a polymer film described in JP 2001-343529 A (WO 01/37007 A1) may be used. For example, a resin composition containing a thermoplastic resin having a substituted or unsubstituted imide group in a side chain thereof, and a thermoplastic resin having a substituted or unsubstituted phenyl group and a nitrile group in side chains thereof may be used as a material for the film, and the composition is, for example, a resin composition containing an alternating copolymer formed of isobutene and N-methylmaleimide, and an acrylonitrile-styrene copolymer. The polymer film may be, for example, an extrudate of the resin composition. A (meth)acrylic resin or a cyclic olefin-based resin may be preferably used.

A-3. Retardation Plate

Any appropriate configuration may be adopted as the retardation plate as long as such optical monochromatization as described above can be performed.

As described above, the in-plane retardation Re(550) of the retardation plate is preferably from 200 nm to 2,000 nm. The in-plane retardation Re(550) of the retardation plate may be appropriately set within the range in accordance with, for example, a desired color of the background color and the slow axis angle.

The retardation plate has an in-plane retardation as described above, and hence has a relationship of nx>ny. The retardation plate shows any appropriate refractive index ellipsoid as long as the retardation plate has a relationship of nx>ny. The refractive index ellipsoid of the retardation plate preferably shows a relationship of nx>ny≥nz.

The retardation plate includes a resin film (typically a stretched film of the resin film) that may satisfy such characteristics as described above. Typical examples of the resin for forming the retardation plate include a polyester-based resin (e.g., polyethylene terephthalate or polyethylene naphthalate), a polycarbonate-based resin, a polyether-based resin (e.g., polyether ether ketone), a polystyrene-based resin, and a cyclic olefin-based resin. In particular, a polyester-based resin and a polycarbonate-based resin may each be suitably used because each of the resins has a large intrinsic birefringence, and relatively easily provides a large in-plane retardation even when its stretching ratio is low or its thickness is small.

The retardation plate may be obtained by stretching the resin film. Any appropriate stretching method and stretching conditions (e.g., a stretching temperature, a stretching ratio, and a stretching direction) may be adopted for the stretching in accordance with a desired in-plane retardation (ultimately, a desired color of the background color).

The retardation plate may be a single resin film (stretched film), or may be a laminated film obtained by laminating a plurality of resin films (stretched films). The single film has an advantage in that the film is easily produced and is available at low cost. The laminated film has an advantage in that its in-plane retardation is easily adjusted.

The thickness of the retardation plate (in the case of a laminated film, its total thickness) may be appropriately set in accordance with, for example, a desired in-plane retardation and a constituent material.

A commercially available retardation film may be used as the retardation plate, or a product obtained by subjecting the commercially available retardation film to secondary processing (e.g., stretching) may be used.

B. Image Synthesis Method

Figure 5A:
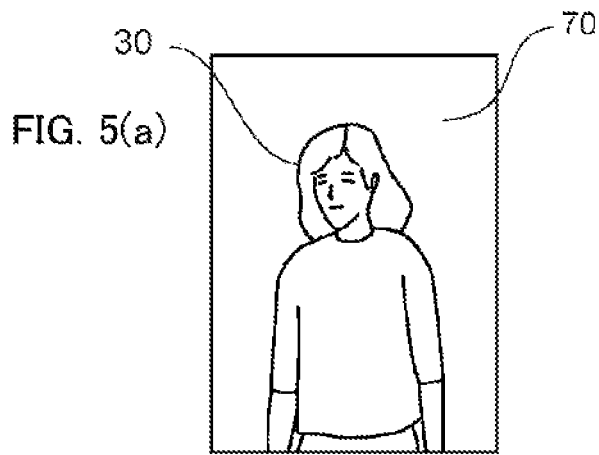
FIG. 5(a) to FIG. 5(c) are each a schematic view for illustrating an image synthesis method according to one embodiment of the present invention.
Figure 5B:
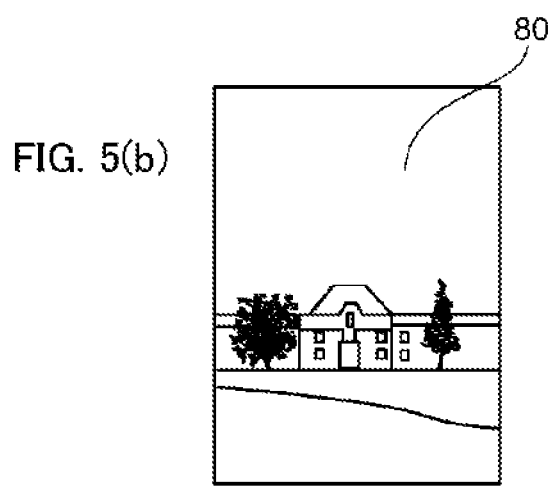
Figure 5C:
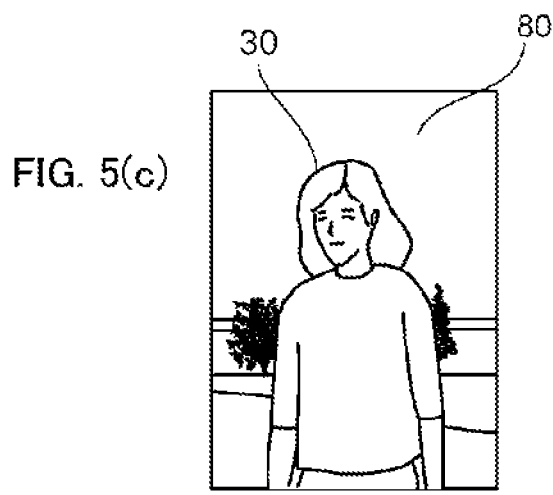

An image synthesis method of the present invention includes synthesizing the background image portion of the image generated in the section A, which includes the object and the monochromatized background portion, with another image. FIG. 5(a) to FIG. 5(c) are each a schematic view for illustrating the image synthesis method according to one embodiment of the present invention. First, as described in the section A, as illustrated in FIG. 5(a), an image including the object 30 and a monochromatized background portion 70 is generated. As described above, the background portion 70 is obtained by optically coloring the second polarizing plate 40 in the displayed image (taken image) of the image taking apparatus. Information about the color of the background portion is transparentized as a key signal by using a predetermined video synthesis technology. Meanwhile, as illustrated in FIG. 5(b), another image 80 serving as the final background image is prepared. When information about the other image 80 is introduced into the transparentized background portion 70, as illustrated in FIG. 5(c), a synthesized image including the object 30 and the other image (final background image) 80 may be obtained.

EXAMPLES

The present invention is specifically described below by way of Examples. However, the present invention is not limited by these Examples. Evaluation items in Examples are as described below.

(1) Uniformity of Color

In the image synthesis of each of Examples and Comparative Example, the presence or absence of a need for the use of a lighting fixture for a backscreen was confirmed, and was evaluated by the following criteria.

○: There is no need to use the lighting fixture.

x: There is a need to use the lighting fixture.

(2) Coloring of Object

The coloring of the peripheral edge portion (vicinity of the contour) of an object in a synthesized image obtained in each of Examples and Comparative Example was visually observed, and was evaluated by the following criteria.

○: No coloring was observed.

x: Coloring was observed.

(3) Lighting from Rear

A case in which lighting was applied from the rear of the object in the image synthesis of each of Examples and Comparative Example was evaluated by the below-indicated criteria. The illuminance of lighting on the camera side of the object was 800 lx, and a halogen lighting fixture (corresponding to 500 W) was used as rear lighting. The rear lighting was arranged at an angle of 45° in a height direction and at a distance of 1.5 m from the object.

⊚: The lighting from the rear was possible, and no coloring of the object was observed.

○: The lighting from the rear was possible, and slight coloring of the object was observed but fell within an acceptable range.

Δ: The lighting from the rear was possible, but the coloring of the object was remarkable.

x: The lighting from the rear was impossible.

(4) Simplicity

In the image synthesis of each of Examples and Comparative Example, the presence or absence of needs for (i) a large studio at the time of the synthesis of an outdoor scene, (ii) a large number, or many kinds, of lighting fixtures, and (iii) precise adjustment of lighting by a lighting technician was confirmed, and was evaluated by the following criteria.
  ○: None of the (i) to the (iii) was needed.
  x: At least one of the (i), the (ii), or the (iii) was needed.

Example 1

A polarizing plate (first polarizing plate) and a retardation plate were sequentially mounted to the tip portion of the lens of a camera for television shooting from the lens side. A commercially available polarizing plate (which was obtained by removing a pressure-sensitive adhesive from a product available under the product name "SEG1425GU" from Nitto Denko Corporation) was used as the first polarizing plate. A laminate obtained by laminating two commercially available polycarbonate resin retardation films (manufactured by Kaneka Corporation, product name: "TR430", in-plane retardation Re(550)=430 nm) so that their slow axes were parallel to each other was used as the retardation plate. The in-plane retardation Re(550) of the retardation plate (laminate) was 860 nm. The direction of the absorption axis of the polarizer of the first polarizing plate was set in a vertical direction, and the direction of the slow axis of the retardation plate was set in a direction at 45° counterclockwise with respect to the vertical direction when viewed from the retardation plate side. Hereinafter, in Examples and Comparative Example, the vertical direction is defined as 90°, a horizontal direction is defined as 0°, and a counterclockwise direction with respect to the vertical direction when viewed from the retardation plate side is defined as a "plus (+) direction" (e.g., 135° corresponds to 45° counterclockwise with respect to the vertical direction when viewed from the retardation plate side). Next, a commercially available polarizing plate (second polarizing plate) was arranged at a predetermined position. At this time, the absorption axis of the polarizer of the second polarizing plate was set to 0°. Against the background of the polarizing plate, an image of an object (person) was taken with the camera for television shooting having mounted thereto the first polarizing plate and the retardation plate. The background (second polarizing plate) in the taken image had a uniform green color.

Next, information about the color of the background portion of the taken image was transparentized as a key signal by using an ordinary method. Further, information about another image (scene image) was introduced into the transparentized portion. Thus, a synthesized image was obtained.

With regard to this Example, the evaluations (1) to (4) were performed. The results are shown in Table 1. Further, with regard to the lighting from the rear, the object was observed while a lighting angle was changed. As a result, it was confirmed that the coloring of the object was significantly suppressed in the lighting angle range of from 38° to 75°.

Example 2

A synthesized image was obtained in the same manner as in Example 1 except that: the absorption axis direction of the polarizer of the first polarizing plate was set to 0°; the direction of the slow axis of the retardation plate was set to 45°; and the absorption axis direction of the polarizer of the second polarizing plate was set to 90°. With regard to this Example, the same evaluations as those of Example 1 were performed. The results are shown in Table 1.

Example 3

A synthesized image was obtained in the same manner as in Example 1 except that: the absorption axis direction of the polarizer of the first polarizing plate was set to 0°; the in-plane retardation Re(550) of the retardation plate was set to 1,570 nm; the direction of the slow axis of the retardation plate was set to 45°; and the absorption axis direction of the polarizer of the second polarizing plate was set to 0°. With regard to this Example, the same evaluations as those of Example 1 were performed. The results are shown in Table 1. A laminate obtained by laminating the retardation film used in Example 1 and two commercially available polycarbonate resin retardation films (manufactured by Kaneka Corporation, product name: "TR570", in-plane retardation Re(550)=570 nm) so that their slow axes were parallel to each other was used as the retardation plate.

Example 4

A synthesized image was obtained in the same manner as in Example 1 except that: the absorption axis direction of the polarizer of the first polarizing plate was set to 90°; the in-plane retardation Re(550) of the retardation plate was set to 1,570 nm; the direction of the slow axis of the retardation plate was set to 135°; and the absorption axis direction of the polarizer of the second polarizing plate was set to 90°. With regard to this Example, the same evaluations as those of Example 1 were performed. The results are shown in Table 1. The same retardation plate as that of Example 3 was used as the retardation plate.

Example 5

A synthesized image was obtained in the same manner as in Example 1 except that: the absorption axis direction of the polarizer of the first polarizing plate was set to 90°; the in-plane retardation Re(550) of the retardation plate was set to 570 nm; the direction of the slow axis of the retardation plate was set to 135°; and the absorption axis direction of the polarizer of the second polarizing plate was set to 0°. With regard to this Example, the same evaluations as those of Example 1 were performed. The results are shown in Table 1. The polycarbonate resin retardation film having an in-plane retardation Re(550) of 570 nm, which had been used in Example 2, was used as the retardation plate.

Example 6

A synthesized image was obtained in the same manner as in Example 1 except that: the absorption axis direction of the polarizer of the first polarizing plate was set to 0°; the in-plane retardation Re(550) of the retardation plate was set to 570 nm; the direction of the slow axis of the retardation plate was set to 45°; the absorption axis direction of the polarizer of the second polarizing plate was set to 0°; and the object was changed to blue paper. With regard to this Example, the same evaluations as those of Example 1 were performed. The results are shown in Table 1. The polycarbonate resin retardation film having an in-plane retardation Re(550) of 570 nm, which had been used in Example 2, was used as the retardation plate.

Example 7

A synthesized image was obtained in the same manner as in Example 1 except that: the absorption axis direction of the polarizer of the first polarizing plate was set to 90°; the in-plane retardation Re(550) of the retardation plate was set to 430 nm; the direction of the slow axis of the retardation plate was set to 135°; the absorption axis direction of the polarizer of the second polarizing plate was set to 0°; and the object was changed to dark blue paper. With regard to this Example, the same evaluations as those of Example 1 were performed. The results are shown in Table 1. The polycarbonate resin retardation film having an in-plane retardation Re(550) of 430 nm, which had been used in Example 1, was used as the retardation plate.

Example 8

A synthesized image was obtained in the same manner as in Example 1 except that: the absorption axis direction of the polarizer of the first polarizing plate was set to 0°; the in-plane retardation Re(550) of the retardation plate was set to 430 nm; the direction of the slow axis of the retardation plate was set to 45°; the absorption axis direction of the polarizer of the second polarizing plate was set to 0°; and the object was changed to yellow paper. With regard to this Example, the same evaluations as those of Example 1 were performed. The results are shown in Table 1. The polycarbonate resin retardation film having an in-plane retardation Re(550) of 430 nm, which had been used in Example 1, was used as the retardation plate.

Example 9

A synthesized image was obtained in the same manner as in Example 1 except that: the absorption axis direction of the polarizer of the first polarizing plate was set to 90°; the in-plane retardation Re(550) of the retardation plate was set to 1,570 nm; the direction of the slow axis of the retardation plate was set to 135°; the absorption axis direction of the polarizer of the second polarizing plate was set to 0°; and the object was changed to green paper. With regard to this Example, the same evaluations as those of Example 1 were performed. The results are shown in Table 1. The same retardation plate as that of Example 3 was used as the retardation plate.

Comparative Example 1

A synthesized image was obtained by a conventional method. Specifically, green cloth was used as a backscreen, and an image of an object (person) was taken with a typical camera for television shooting against the background of the backscreen. The synthesized image was obtained by performing the subsequent procedure in the same manner as in Example 1. With regard to this comparative example, the same evaluations as those of Example 1 were performed. The results are shown in Table 1.

TABLE 1

| | Absorption axis direction of first polarizing plate | Slow axis direction of retardation plate | Re(550) of retardation plate | Absorption axis direction of second polarizing plate | Background color | Uniformity of color | Coloring of object | Rear lighting | Simplicity |
|---|---|---|---|---|---|---|---|---|---|
| Example 1 | 90° | 135° | 860 | 0° | Green | ◯ | ◯ | ◎ | ◯ |
| Example 2 | 0° | 45° | 860 | 90° | Green | ◯ | ◯ | ◯ | ◯ |
| Example 3 | 0° | 45° | 1,570 | 0° | Green | ◯ | ◯ | ◎ | ◯ |
| Example 4 | 90° | 135° | 1,570 | 90° | Green | ◯ | ◯ | ◯ | ◯ |
| Example 5 | 90° | 135° | 570 | 0° | Blue | ◯ | ◯ | ◎ | ◯ |
| Example 6 | 0° | 45° | 570 | 0° | Orange | ◯ | ◯ | ◎ | ◯ |
| Example 7 | 90° | 135° | 430 | 0° | Yellow | ◯ | ◯ | ◎ | ◯ |
| Example 8 | 0° | 45° | 430 | 0° | Dark blue | ◯ | ◯ | ◎ | ◯ |
| Example 9 | 90° | 135° | 1,570 | 0° | Magenta | ◯ | ◯ | ◎ | ◯ |
| Comparative Example 1 | — | — | — | — | Green | X | X | X | X |

*The Re(550) is represented in the unit of (nm).

As is apparent from Table 1, it is found that according to Examples of the present invention, a large studio, a large number, or many kinds, of lighting fixtures, and the know-how of a lighting technician are not needed, undesired coloring of the object is suppressed, even a change in color of the object can be easily dealt with, and light from the rear can be utilized, and as a result, an entire image having excellent image quality can be achieved.

INDUSTRIAL APPLICABILITY

The image generation method and the image synthesis method according to the embodiments of the present invention may be suitably used in a video field, such as television broadcasting or a movie.

REFERENCE SIGNS LIST 10 image taking apparatus
20 first polarizing plate
30 object
40 second polarizing plate
50 retardation plate

The invention claimed is:
1. An image generation method, comprising:
arranging an image taking apparatus, a first polarizing plate, an object, and a second polarizing plate in the stated order;
arranging a retardation plate between the first polarizing plate and the second polarizing plate; and
monochromatizing a color of the second polarizing plate recognized by the image taking apparatus to a color complementary to that of the object through use of the retardation plate.

2. The image generation method according to claim 1, wherein the first polarizing plate and the second polarizing plate are arranged so that an absorption axis of a polarizer of the first polarizing plate and an absorption axis of a polarizer of the second polarizing plate are substantially perpendicular or substantially parallel to each other.

3. The image generation method according to claim 1, wherein the retardation plate is arranged so that an angle formed by a slow axis of the retardation plate, and an absorption axis of a polarizer of the first polarizing plate and/or an absorption axis of a polarizer of the second polarizing plate is from 40° to 50° or from 130° to 140°.

4. The image generation method according to claim 1, wherein the retardation plate has an in-plane retardation Re(550) of 200 nm or more.

5. The image generation method according to claim 1, wherein the color of the second polarizing plate recognized by the image taking apparatus is monochromatized to a green color.

6. The image generation method according to claim 1, further comprising arranging a lighting apparatus on a side of the second polarizing plate opposite to the object, wherein the lighting apparatus has a lighting angle of 38° or more with respect to a straight line connecting the image taking apparatus and the object when viewed from above.

7. An image synthesis method, comprising:
arranging an image taking apparatus, a first polarizing plate, an object, and a second polarizing plate in the stated order;
arranging a retardation plate between the first polarizing plate and the second polarizing plate;
monochromatizing a color of the second polarizing plate recognized by the image taking apparatus to a color complementary to that of the object through use of the retardation plate;
transparentizing the color of the second polarizing plate that has been monochromatized; and
synthesizing the transparentized portion with another image.

8. An image generation method, comprising:
arranging an image taking apparatus, a first polarizing plate, an object, and a second polarizing plate in the stated order;
arranging a retardation plate between the first polarizing plate and the second polarizing plate; and
monochromatizing a color of the second polarizing plate recognized by the image taking apparatus to a color complementary to that of the object through use of the retardation plate,
wherein the first polarizing plate and the second polarizing plate are arranged so that an absorption axis of a polarizer of the first polarizing plate and, an absorption axis of a polarizer of the second polarizing plate are substantially perpendicular or substantially parallel to each other,
wherein the retardation plate is arranged so that an angle formed by a slow axis of the retardation plate, and an absorption axis of a polarizer of the first polarizing plate and/or an absorption axis of a polarizer of the second polarizing plate is from 40° to 50° or from 130° to 140°, and
wherein the retardation plate has an in-plane retardation Re(550) of 200 nm to 2,000 nm.

* * * * *